Patented Aug. 13, 1935

2,010,919

UNITED STATES PATENT OFFICE 2,010,919

METHOD OF PRODUCING TEA FREE FROM THEINE

Theodor Grethe, Hamburg, Germany

No Drawing. Application November 14, 1933, Serial No. 698,015. In Germany November 17, 1932

3 Claims. (Cl. 99—8)

This invention relates to a method of producing tea free from theine.

In my co-pending application Ser. No. 614,848, protection is sought for a method of producing tea free from theine, according to which the tea, prior to being subjected to extraction by an organic theine solvent or a mixture thereof, is moistened with water and after removal of the main part of the extraction agent is dried with warm air or a warm inert gas, possibly at reduced air pressure, so that the heating of the tea does not exceed a temperature of 65° centigrade, the treatment being interrupted by moistening the tea leaves with water, which may be done once or several times.

It has been found now that the aroma of tea treated in the manner described can be considerably improved by exposing the tea for a short time, amounting approximately to 5 to 8 minutes, to the action of water vapor while the temperature limit for the tea remains about 65° centigrade, and, preferably, the temperature is kept at 50° to 52° centigrade.

This water vapor treatment may take place after the solvent has been eliminated from the tea by the passage of air having room temperature or of heated air or of another gas.

It is still more advantageous to draw off the extraction agent from the tea after extraction, as a high temperature of the tea can better be prevented in this manner. There will then be 1 kg. extraction agent for 1 kg. tea. Steam is then passed through for 5 to 8 minutes and the largest portion of the extraction agent removed with the steam which, simultaneously, has an aromatizing effect upon the tea. The next step is the drying of the soaked tea by means of warm air, as described in the co-pending application mentioned.

Treatment with water vapor may be effected also in the vacuum. The method can be further improved by cooling the tea after the extraction and the passage of steam by blowing through cold air for 5 to 10 minutes, whereupon this moisture-containing tea is dried in vacuum at 65° to 70° centigrade without passing more air therethrough, which requires about one and a half hours.

The invention can be applied for example by extracting the tea leaves, moistened with water at room temperature or while slightly heating the solvent, by means of methylene chloride until the theine content amounts to approximately 0.1%, which will be the case after 2½ to 3 hours. The solvent is then drained off from the leaves and expanded steam of 100° centigrade blown through for about 2½ minutes until the temperature thereof is about 55° centigrade at discharge. Then warm air having room temperature is passed through for 5 to 10 minutes whereupon drying in vacuum takes place, so that heating of the tea does not exceed 65° to 70° centigrade. Drying is completed after approximately one and a half hours.

I claim:

1. A method of producing tea free from theine by subjecting moistened tea to extraction with a theine solvent, and then treating the tea at a temperature not exceeding about 65° centigrade with water vapor.

2. A method of producing tea free from theine by subjecting the moistened tea to extraction with a theine solvent, and then treating the tea under reduced pressure and at a temperature not exceeding about 65° centigrade with water vapor.

3. A method of producing tea free from theine by subjecting the moistened tea to extraction with a theine solvent, draining off the solvent, blowing water vapor at a temperature of 100° centigrade through the mass until the temperature thereof at discharge is about 55° centigrade, passing air through the mass and drying the tea under reduced pressure in such a manner that the temperature of the tea does not exceed about 65° centigrade.

THEODOR GRETHE.